(12) United States Patent
Turner et al.

(10) Patent No.: US 6,650,470 B1
(45) Date of Patent: Nov. 18, 2003

(54) SEMI-TRANSPARENT GRAPHIC WINDOW FOR A REAL IMAGING SYSTEM

(75) Inventors: Randolph J. Turner, Ithaca, NY (US); Douglas L. Robinson, Ithaca, NY (US); Kenneth S. Westort, Ithaca, NY (US)

(73) Assignee: Optical Products Development Corp., Ithaca, NY (US)

( * ) Notice: Subject to any disclaimer, the term of this patent is extended or adjusted under 35 U.S.C. 154(b) by 26 days.

(21) Appl. No.: 10/147,632

(22) Filed: May 16, 2002

(51) Int. Cl.⁷ .............................................. G03B 21/56
(52) U.S. Cl. ...................................... 359/443; 359/460
(58) Field of Search ................................... 359/443, 447, 359/478, 448, 471, 460; 353/10, 28; 348/44; 352/86

(56) References Cited

U.S. PATENT DOCUMENTS

| | | | |
|---|---|---|---|
| 1,218,979 A | * 3/1917 | Cahill | 353/28 |
| 2,545,675 A | * 3/1951 | Scott | 359/448 |
| 3,090,280 A | * 5/1963 | Winter, Jr. | 353/28 |
| 3,647,284 A | 3/1972 | Elings et al. | 350/294 |
| RE27,356 E | 5/1972 | LaRussa | 350/157 |
| 4,093,347 A | 6/1978 | LaRussa | 350/174 |
| 4,373,918 A | * 2/1983 | Berman | 353/28 |
| 4,653,875 A | 3/1987 | Hines | 350/442 |
| 4,802,750 A | 2/1989 | Welck | 350/619 |
| 5,033,843 A | * 7/1991 | Kolff | 359/447 |
| 5,257,130 A | 10/1993 | Monroe | 359/478 |
| 5,268,775 A | 12/1993 | Zeidler | 359/40 |
| 5,291,897 A | 3/1994 | Gastrin et al. | 128/716 |
| 5,305,124 A | 4/1994 | Chern et al. | 359/13 |
| 5,311,357 A | 5/1994 | Summer et al. | 359/479 |
| 5,331,359 A | * 7/1994 | Leclercq | 353/28 |
| 5,486,840 A | 1/1996 | Borrego et al. | 345/7 |
| 5,585,946 A | 12/1996 | Chern | 349/5 |
| 5,596,451 A | 1/1997 | Handschy et al. | 359/633 |
| 5,606,458 A | 2/1997 | Fergason | 359/630 |
| 5,621,572 A | 4/1997 | Fergason | 359/630 |
| 5,649,827 A | * 7/1997 | Suzaki | 353/28 |
| 5,831,712 A | 11/1998 | Tabata et al. | 351/158 |
| 5,886,818 A | 3/1999 | Summer et al. | 359/478 |
| 6,163,408 A | 12/2000 | LaRussa | 359/630 |
| 6,318,868 B1 | 11/2001 | LaRussa | 359/857 |
| 6,323,971 B1 | * 11/2001 | Klug | 353/10 |
| 6,481,851 B1 | * 11/2002 | McNelley et al. | 353/28 |

FOREIGN PATENT DOCUMENTS

| | | | |
|---|---|---|---|
| JP | 07 043634 | 2/1995 | G02B/27/02 |
| JP | 08 152579 | 6/1996 | G02B/27/28 |
| WO | WO 00/65844 | 11/2000 | H04N/9/30 |

OTHER PUBLICATIONS

Jenkins, Francis A and White, Harvey E. "Fundamentals of Optics". McGraw–Hill Publishing Company Ltd. 1937.

* cited by examiner

Primary Examiner—Christopher Mahoney
(74) Attorney, Agent, or Firm—Brown & Michaels, PC

(57) ABSTRACT

A photo-screen device for a real image projection system includes a transparent or semi-transparent material having a fixed or static image applied to the surface thereof, wherein the photo-screen is positioned so as to intersect a real image beampath of the real image projection device. In an alternative embodiment, a method for producing a photo-screen device for a real image projection system includes the steps of printing colors thereon in reverse order and positioning the photo-screen such that the non-printed side faces a viewer of the real image.

17 Claims, 4 Drawing Sheets

SEMI-TRANSPARENT GRAPHIC WINDOW FOR A REAL IMAGING SYSTEM

BACKGROUND OF THE INVENTION

1. Field of the Invention

The invention pertains to the field of optical displays. More particularly, the invention pertains to apparatus and methods for enhancement of a real image projection system.

2. Description of Related Art

The present invention pertains to a real image projection system and, in particular, to such a system in which an image of a real object is formed in space, giving the illusion that a real object exists at that point in space, when in reality it does not.

Visual display systems typically use a curved reflector with a beamsplitter positioned at a 45 degree angle to the curved reflector's optical axis, to divert the input beampath at a 90 degree angle to the viewing axis or imaging beampath. This method has been used since the early 1950s for flight simulation, and commonly is referred to as the WAC window system. These systems typically are used in an on-axis configuration, meaning that the optical axis, or the un-tilted curved reflector's center of radius, is located along the viewing axis. When viewing such an on-axis system, any object within the viewing area images within the system.

One of the earliest working real image displays is depicted in White's 1934 publication of "Fundamentals of Optics". It shows a spherical mirror positioned behind a table. A flower vase is mounted below the table and a real image of the vase is projected sitting on the table-top. In the late 1980's, real image display systems were further developed, typically consisting of two on-axis parabolic reflector segments, as shown in U.S. Pat. No. 4,802,750. In the early 1990's, similar systems were built that use a beamsplitter having high reflection and low transmission, in order to reduce ghosting effects. By 1999, a system was developed using a circularly-polarized window in an on-axis, WAC window-style configuration. For example, U.S. Pat. No. 6,163,408 was issued in 2000. Later, a tilted system was developed, using an off-axis, curved reflector, as disclosed in International Patent Application No. PCT/US00/11234 and PCT Publication No. WO 00/65844. That system comprises a curved reflector tilted at an angle between 5 and 20 degrees from the viewing axis. A beamsplitter is positioned along the viewing axis, tilted at 45 degrees to the curved reflector's axis. This is a significant improvement because it eliminates ghost imaging completely; the system no longer requires a 42% transmission circular polarizer to eliminate ghosting. A 70% transmissive front window is instead used to provide a system transmission of 15%.

With the availability of such high transmission real imaging systems, many new enhancements are possible that were not available previously. One invention that enhances a real image system is a device that is referred to hereinafter as a "photo-screen" device. The device is basically a printed, partially transparent material, which can be incorporated as a front window for a real image projection system. The photo-screen invention is used in a manner roughly similar to but significantly different from that of a scrim. In the interest of avoiding doubt, the term scrim is used herein to describe a material having a weave pattern or perforated pattern, wherein about 50% of the surface is open or transparent and 50% is solid or non-transparent. The scrim typically is used as a projection screen, and also on bus windows to display advertisements, while still allowing light to pass through the windows to the inside of the bus.

A scrim is employed in the imaging system disclosed in U.S. Pat. No. 5,291,297. The patent discloses a perforated scrim located behind a beamsplitter, facing inward toward the display, and not visible to the viewer. The scrim is used as a projection screen, with the image emanating from inside the system, and a virtual image of the scrim photograph is formed and visible behind the CRT face. The image on the scrim is not viewed directly, and the system is not used for a real imaging system.

U.S. Pat. No. 5,257,130 discloses a scrim window in a real image projection system, however the scrim is used to project an image on the face of a cloth-like woven material at the window opening. However, the scrim of the '130 patent is significantly different in structure and method of use than the present "photo-screen" invention described herein. For example, the system disclosed in the '130 patent requires an external light source to be positioned at an oblique angle to the scrim and projected onto the surface of the scrim. In contrast, the present photo-screen invention uses only the ambient light available within the room.

The device disclosed in the '130 patent is used as a diffuser and projection screen, and requires a directed external light source or projector to illuminate the scrim, as described in the specification and claimed in claims one through seven. The device is based on a weave configuration and is limited to a hole pattern density of between five and fifteen points per inch, as recited in claim 12. In contrast, the present photo-screen invention does not use holes, but instead uses a clear dot pattern and has a density of between 25 and 50 points per inch. The reason for the higher density is to increase the resolution of the real image, virtually eliminating the "dotted" appearance from light passing through the dot pattern.

Another significant advantage of the present invention is improved visibility of the background image in a well-lighted room. When used as a projection screen, the scrim of the '130 patent would require subdued lighting conditions to minimize washing out of the image from ambient lighting.

The scrim of the '130 patent, because of its construction method of woven thread, has significant limitations as to the ratio of transmission to reflection. The scrim of the '130 patent is also limited to a cloth or thread material and cannot be constructed onto a rigid substrate.

The printing process used to prepare the photo-screen of the present invention can be performed on any clear substrate, including glass. Perhaps one of the clearest differences between the present photo-screen invention and the scrim disclosed in the '130 patent is that the scrim of the '130 patent does not constitute a printed material. Rather, the image is projected onto the scrim using an external projection source. There is no teaching in the prior art of printed graphics applied to the surface of a scrim. Indeed, the woven thread pattern of the scrim would make printing on the surface thereof effectively an impossible task, and because of the coarse nature of the scrim, there would be very little detail visible in the printed image.

SUMMARY OF THE INVENTION

Briefly stated, a photo-screen device for a real image projection system includes a transparent or semi-transparent material having a fixed or static image applied to the surface thereof, wherein the photo-screen is positioned so as to intersect a real image beampath of the real image projection device.

In an alternative embodiment, a method for producing a photo-screen device for a real image projection system includes the steps of printing colors thereon in reverse order and positioning the photo-screen such that the non-printed side faces a viewer of the real image.

DETAILED DESCRIPTION OF THE INVENTION

Figure 1:
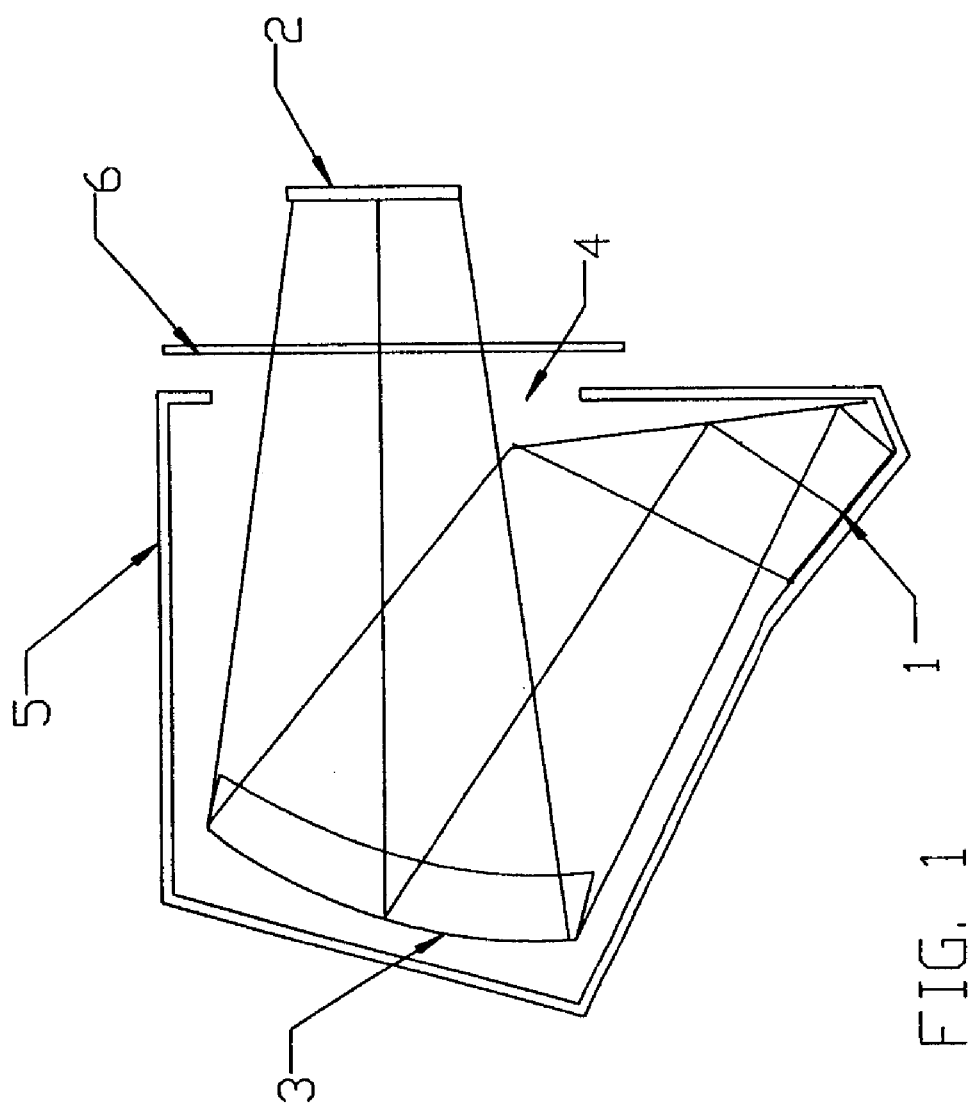
FIG. 1 shows the photo-screen of the present invention positioned within the real image beampath of a single reflector real image projection system.

The present invention, hereinafter referred to as a photo-screen, comprises a transparent substrate material, such as, for example, clear acrylic. The finished photo-screen is actually a picture or photo or graphic, printed onto the transparent substrate material. The image preferably is printed much like a dotted half-tone printing method, typically used in silk-screening, except of a much higher resolution. In the photo-screen of the present invention, the printed graphic has small clear un-printed areas (preferably circular), which allow the real imaging light beams to pass through the photo-screen. When the printed photo-screen is positioned in front of the window, directly in the real image beampath, the viewer sees the photo, poster, or advertisement, appearing as a solid surface, and simultaneously sees the real image floating in space out in front of the poster. Only ambient room light is required to light the poster.

In one example, the optimum dot pattern of the photo-screen has 0.015" diameter clear circles, positioned about 0.020" center to center. In this example, each row of clear circles preferably is offset by 0.010" to eliminate any vertical pattern of holes. This is important to reduce the "fringing" or optical interference pattern as the light from the CRT passes through the small pattern of openings. A vertical hole pattern would produce a visible "banding" or a stripe pattern in the real image, which is highly undesirable. The largest aperture size acceptable is 0.030" positioned at 0.038" center to center. As the size of the clear aperture increases above this amount, the dot pattern becomes visible on the real image to the viewer. The ideal configuration is where the area of the clear circles, or clear areas, equals the area of the printed surface, or approximately 50% transmission of light.

The printed photo-screen appears as a solid poster, but simultaneously allows the light beams that form a real image to pass through the photo-screen. There are several methods of producing the dotted picture, however most have limited ability to register the various color layers, or limited ability to ensure that all the clear dots align in each color layer. The optimum method of fabrication is with a 6-color multi-pass thermal printer. The clear transparency optionally is first printed in black for optimum opacity and absorption of stray light. Next, white is printed, which is necessary, since the substrate is clear instead of white. Then the three primary printing colors (i.e., Cyan, Magenta and Yellow) are printed, and finally, black is again printed. In the case where pigmented colors are employed, the primary printing colors are red, green and blue. The key to success is maintaining proper registration during the printing process. Other manufacturing methods can be used as long as registration is maintained.

In an alternative embodiment, the colors are printed in reverse order (i.e., black, red, green, blue, then white) on the transparent material, and the photo-screen is positioned such that the non-printed side faces the viewer, thereby protecting the printing from being damaged.

The "photo-screen" or semi-transparent picture optionally is attached to a standard printed poster, which has an area cut away that matches the image applied to the photo-screen. The photo-screen is then positioned and secured so that the poster-photo-screen graphics are aligned and appear to be a continuous picture. The real image projection system is then positioned behind the photo-screen, and is positioned such that the beam bundle forming the real image is projected through the surface of the photo-screen. Alternatively, the entire poster is printed in the same manner as the "photo-screen" and applied over a dark colored surface. This alternative provides a nearly imperceptible transition from the window opening to the solid material surrounding it.

The photo-screen also optionally is used to cover the window on a small real image projection system built into a product model. For example, a real image projection device may be built into a replica of an automobile battery, and a photo-screen applied over the window in the side of the battery, appearing to be a decal on the front of the battery. The real image will float out in front of the decal in front of the battery.

Other examples of applications for the photo-screen include constructing a larger-than-life replica of a beverage can, wherein a real image projection system is built inside. A window aperture cut in the side of the can allows the imaging light beam to exit. The can is then "skinned" or wrapped with a printed poster of a soda can label. An area of the poster directly over the window opening is cut away and a photo-screen with an identical graphic as that of the cutout is then attached to the back of the poster wrap, covering the hole. The graphics on both the photo-screen and the label are aligned so that the wrapped can appears to be a large soda can, which appears not to have any holes in it. The real image is projected through the photo-screen label, forming an image floating in free space several inches in front of the soda can replica. The advertising applications of the photo-screen of the present invention are thus readily apparent.

The photo-screen of the present invention can be used with any real image projection system. Following are some illustrative examples.

FIG. 1 depicts a real image projection system incorporating a photo-screen (6) positioned in front of the window opening (4) of the chassis (5) or housing of the real image projection system. Light from the target object (1) or monitor reflects off of a fold mirror (7), deflecting the light beam to the curved reflector (3). The beampath then becomes converging, passing through the window opening (4), then through the photo-screen (6), forming a real image (2) floating in front of the photo-screen (6).

Figure 2:
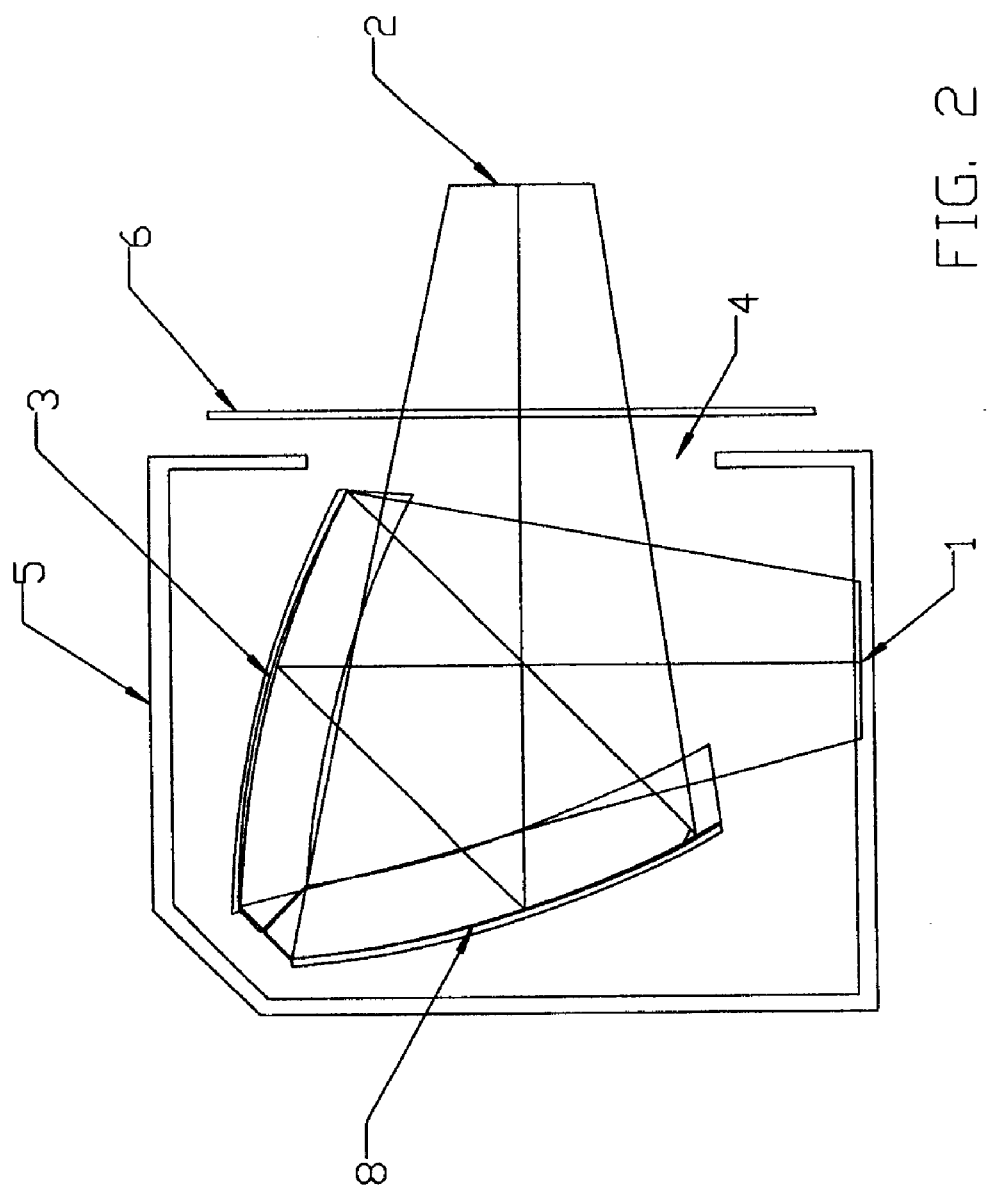
FIG. 2 shows the photo-screen of the present invention positioned within the real image beampath of a dual parabolic or aspherical reflector real imaging system.

FIG. 2 depicts an alternate configuration of a real image projection system, utilizing two curved reflectors (3, 8), of parabolic, aspherical, or other curves, incorporating a photo-screen (6) positioned in front of the window opening (4) of the real image projection system. Light from the target object or monitor (1) strikes the upper reflector (3) in a diverging beam. It then reflects in a collimated beam to the lower reflector (8), then reflects in a diverging beam through the window opening (4), through the photo-screen (6), forming a real image (2) in free space directly in front of the photo-screen (6).

Figure 3:
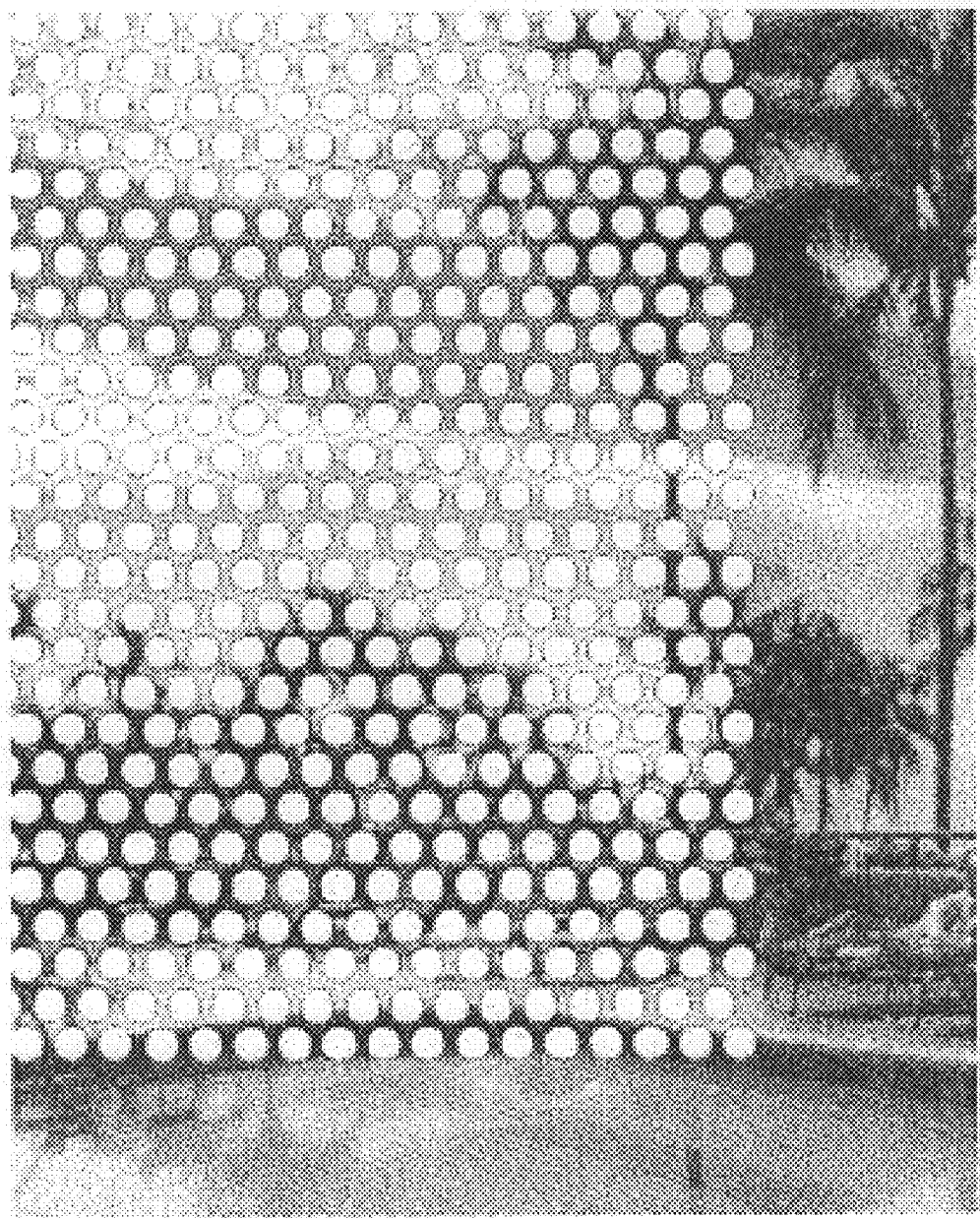
FIG. 3 shows one possible pattern of clear circles or holes in a photograph forming the photo-screen device of the present invention.

FIG. 3 shows a close up of one of the possible configurations of the photo-screen. The small white circles or dots are transparent, while the area around the dots is printed.

Figure 4:
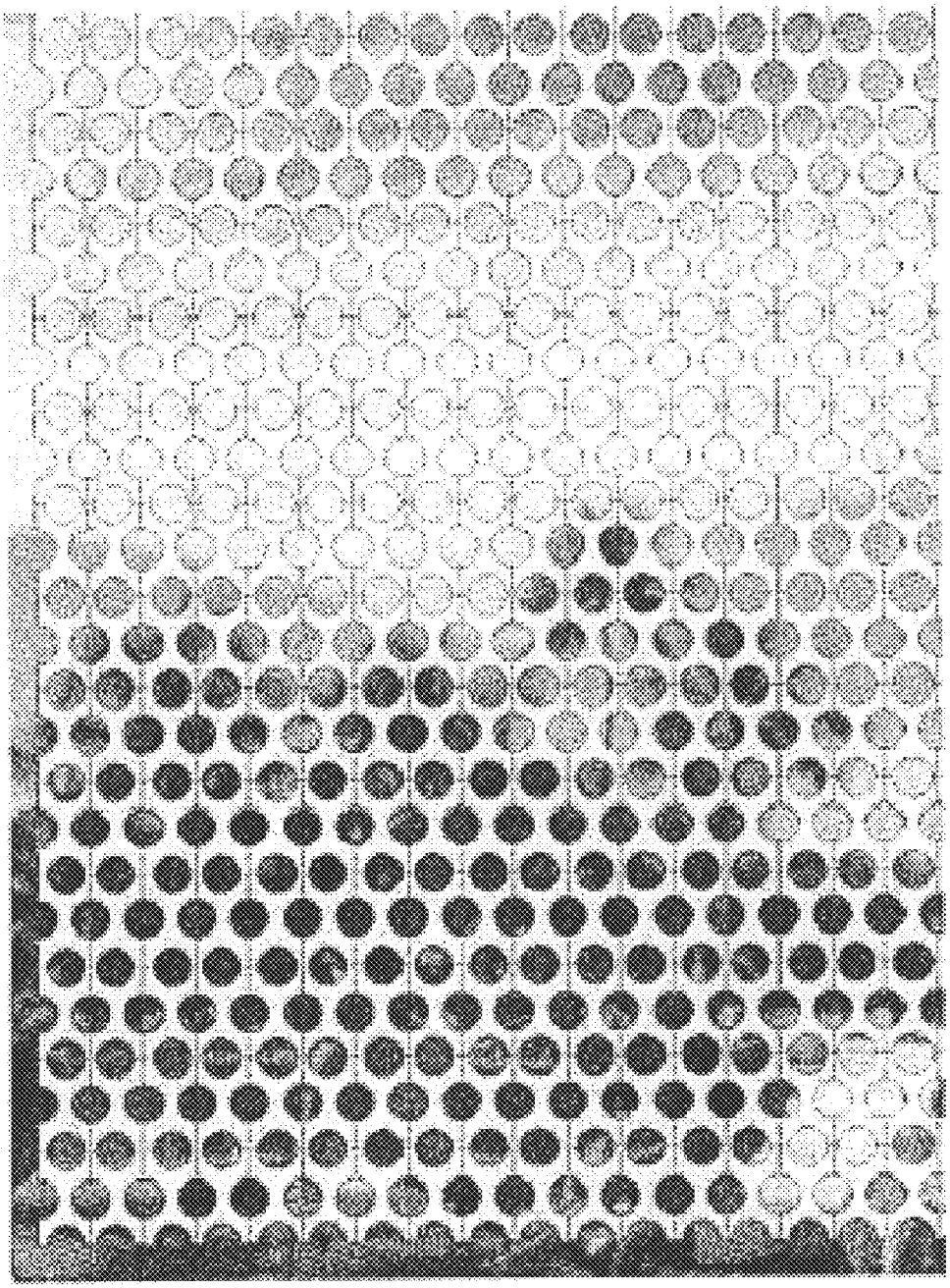
FIG. 4 shows an alternate configuration for the photo-screen where the printed area is in the circle pattern.

FIG. 4 shows an alternate configuration of the photo-screen, wherein the circles or dots are printed and the area around the dots is transparent.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A photo-screen device for a real image projection system, comprising a transparent or semi-transparent material having a fixed or static image applied to the surface thereof, wherein said photo-screen is positioned so as to intersect a real image beampath of said real image projection system, and wherein said real image beampath passes through said photo-screen and forms a real image floating in space in front of said projection system.

2. The photo-screen device of claim 1, wherein said transparent or semi-transparent material comprises glass, acrylic, Mylar or any other transparent or semi-transparent material.

3. The photo-screen device of claim 1, wherein a semi-transparent surface is achieved by creating small holes in a surface of said material, and printing a graphic across said surface.

4. The photo-screen device of claim 1, wherein an image is applied to a surface of said transparent or semi-transparent material in an alternating, fully or partially transparent or opaque pattern.

5. The photo-screen device of claim 4, wherein said pattern comprises random shapes and/or sizes, arranged in either a uniform or random pattern, wherein said pattern includes substantially uniform areas of clear transparent surface for light transmission distributed over said surface.

6. The photo-screen device of claim 4, wherein said pattern comprises dots forming a printed graphic or picture, and areas between said dots are clear.

7. The photo-screen device of claim 6, wherein said dots are between 0.005" in diameter and 0.050" in diameter, or of equivalent area when non-round dots are used.

8. The photo-screen device of claim 6, wherein said dots are substantially uniformly spaced, such that a printed area is between about 30% and 70% of a total area of said surface, depending upon the application and required brightness of said real image.

9. The photo-screen device of claim 8, wherein a ratio of printed area to clear area is about 1:1.

10. The photo-screen device of claim 6, wherein said pattern comprises alternate rows of dots offset horizontally, so that a vertical pattern of dots is not in a straight line, such that the chance of creating a light interference pattern or banding visible in said real image is reduced.

11. The photo-screen device of claim 4, wherein said pattern comprises dots containing a clear area, and areas between said dots form a printed graphic or picture.

12. The photo-screen device of claim 11, wherein said dots are between 0.005" in diameter and 0.050" in diameter, or of equivalent area when non-round dots are used.

13. The photo-screen device of claim 11, wherein said dots are substantially uniformly spaced, such that a printed area is between about 30% and 70% of a total area of said surface, depending upon the application and required brightness of said real image.

14. The photo-screen device of claim 13, wherein a ratio of printed area to clear area is about 1:1.

15. The photo-screen device of claim 11, wherein said pattern comprises alternate rows of dots offset horizontally, so that a vertical pattern of dots is not in a straight line, such that the chance of creating a light interference pattern or banding visible in said real image is reduced.

16. The photo-screen device of claim 4, wherein said image is applied to said surface of said transparent or semi-transparent material using a thermal jet printer, inkjet printer, silk screen or any other method that maintains registration or alignment of dots as various color layers are applied.

17. A method for producing a photo-screen device for a real image projection system, comprising the steps of printing colors thereon in reverse order and positioning said photo-screen such that the non-printed side faces a viewer of said real image.

* * * * *